United States Patent
Wisniowski

(10) Patent No.: US 10,268,203 B2
(45) Date of Patent: Apr. 23, 2019

(54) CALIBRATION VALIDATION FOR AUTONOMOUS VEHICLE OPERATIONS

(71) Applicant: GM GLOBAL TECHNOLOGY OPERATIONS LLC, Detroit, MI (US)

(72) Inventor: Matthias Wisniowski, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 119 days.

(21) Appl. No.: 15/492,910

(22) Filed: Apr. 20, 2017

(65) Prior Publication Data
US 2018/0307238 A1   Oct. 25, 2018

(51) Int. Cl.
*G05D 1/02* (2006.01)
*B60R 1/00* (2006.01)

(52) U.S. Cl.
CPC ............ *G05D 1/0246* (2013.01); *B60R 1/00* (2013.01); *B60R 2300/30* (2013.01)

(58) Field of Classification Search
CPC ...... G05D 1/0246; B60R 1/00; B60R 2330/30
USPC ......................................................... 701/28
See application file for complete search history.

(56) References Cited

U.S. PATENT DOCUMENTS

| | | | | |
|---|---|---|---|---|
| 9,809,167 | B1* | 11/2017 | Badger, II | ............. B60Q 9/008 |
| 2004/0252193 | A1* | 12/2004 | Higgins | ............... G08G 1/0175 |
| | | | | 348/149 |
| 2016/0291155 | A1* | 10/2016 | Nehmadi | .............. G01S 17/023 |
| 2016/0292905 | A1* | 10/2016 | Nehmadi | ................ G01S 17/08 |

* cited by examiner

*Primary Examiner* — Yazan A Soofi
(74) *Attorney, Agent, or Firm* — Lorenz & Kopf LLP

(57) ABSTRACT

Systems and method are provided for controlling a vehicle. In one embodiment, a vehicle includes: an imaging device, a reference data source, one or more sensors, one or more actuators, and a controller. The controller detects a stationary condition based at least in part on the sensor output, obtains an image during the stationary condition, identifies a reference position for a reference object based on reference data for a field of view of the imaging device during the stationary condition, identifies the reference object at a second position within the image, validates a transformation associated with the imaging device based on a difference between the reference position and the second position, and thereafter autonomously operates the one or more actuators in a manner that is influenced by the validated transformation.

16 Claims, 8 Drawing Sheets

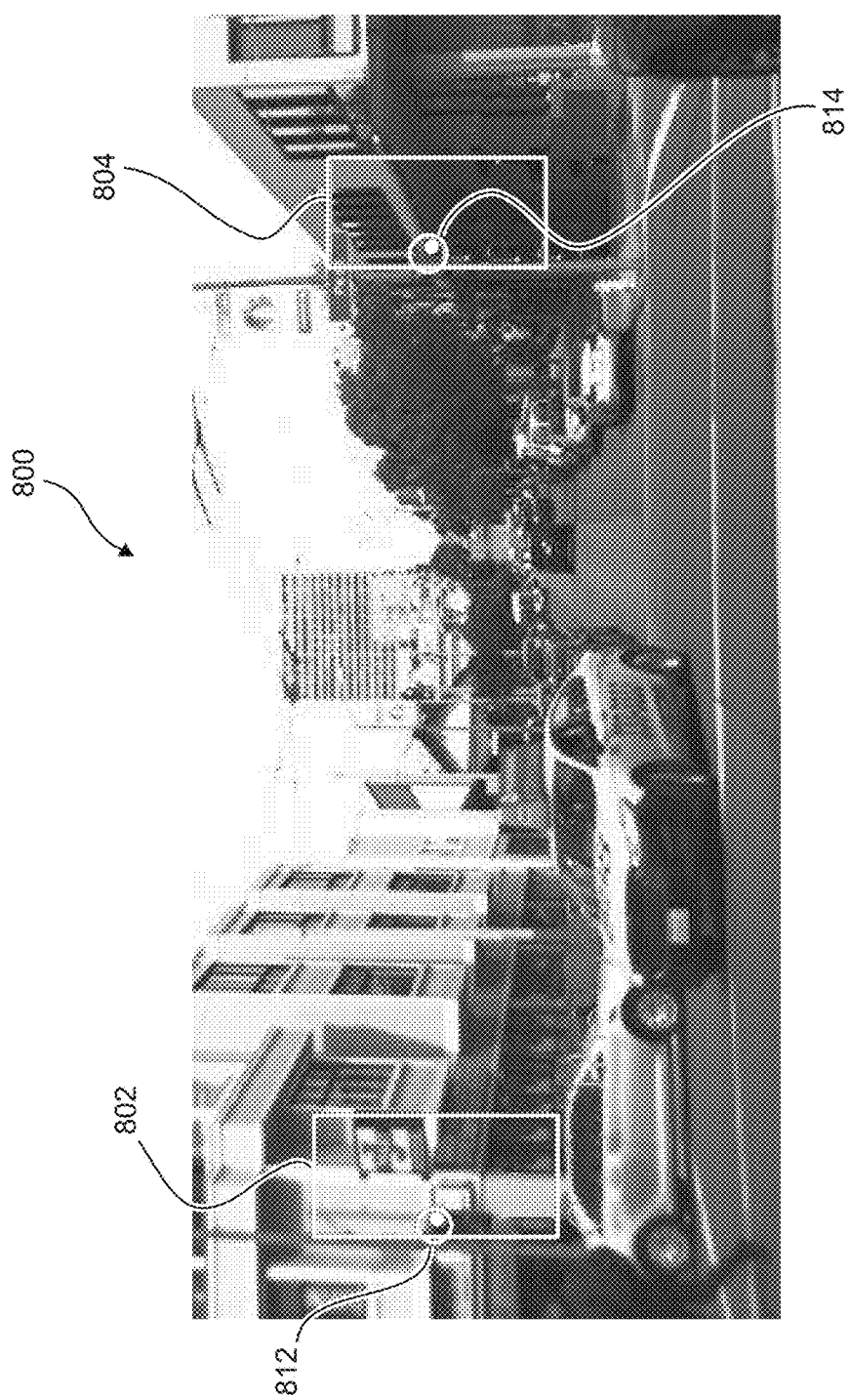

CALIBRATION VALIDATION FOR AUTONOMOUS VEHICLE OPERATIONS

TECHNICAL FIELD

The present disclosure generally relates to automotive vehicles, and more particularly relates to systems and methods for validating previously calibrated relationships between different types of data representative of the operating environment to support continued autonomous operation.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

To achieve high level automation, vehicles are often equipped with an increasing number of different types of devices for analyzing the environment around the vehicle, such as, for example, cameras or other imaging devices capturing imagery of the environment, radar or other ranging devices for surveying or detecting features within the environment, and the like. In practice, the different onboard devices are located at different locations onboard the vehicle and typically operate at different sampling rates or refresh rates, and as a result, capture different types of data corresponding to different points in time from different viewpoints or perspectives. Calibrating relationships between different devices improves the ability to accurately establish correlations between different types of data, which, in turn, facilitate assigning attributes to objects or features within the environment more accurately, thereby improving autonomous vehicle controls.

In practice, there are numerous sources of noise or error that can impact the accuracy of the calibration, either initially or over time. Accordingly, it is desirable to also recognize potential calibration anomalies and undertake appropriate remedial action(s) to mitigate potential degradation of the calibration. Other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle. In one embodiment, a method includes: detecting, by a control module onboard the vehicle, a stationary condition of the vehicle based at least in part on output of a sensor system onboard the vehicle, obtaining, by the control module, an image from an imaging device onboard the vehicle during the stationary condition in response to detecting the stationary condition, obtaining, by the control module, reference data for a field of view of the imaging device at a vehicle pose during the stationary condition, identifying, by the control module, a reference position for a reference object based on the reference data, identifying, by the control module, the reference object at a second position within the image, and validating, by the control module, a transformation associated with the imaging device based on a difference between the reference position and the second position.

In another embodiment, an autonomous vehicle is provided, which includes: an imaging device onboard the vehicle, a reference data source, one or more sensors onboard the vehicle, one or more actuators onboard the vehicle, and a controller that, by a processor, detects a stationary condition based at least in part on output of the one or more sensors, obtains an image from the imaging device during the stationary condition, obtains reference data for a field of view of the imaging device at a vehicle pose during the stationary condition from the reference data source, identifies a reference position for a reference object based on the reference data, identifies the reference object at a second position within the image, validates a transformation associated with the imaging device based on a difference between the reference position and the second position, and thereafter autonomously operates the one or more actuators onboard the vehicle in a manner that is influenced by the validated transformation.

In another embodiment, a method of controlling a vehicle includes: obtaining first data from a sensing device onboard the vehicle during a stationary condition, identifying an expected position for a reference object within the first data based on reference data corresponding to a field of view of the sensing device and one or more calibrated transformation parameter values associated with the sensing device, identifying the reference object at an observed position within the first data, initiating a remedial action with respect to sensing device when a difference between the expected position and the observed position is greater than a threshold, and validating the one or more calibrated transformation parameter values when the difference between the expected position and the observed position is less than the threshold.

DESCRIPTION OF THE DRAWINGS

The exemplary embodiments will hereinafter be described in conjunction with the following drawing figures, wherein like numerals denote like elements, and wherein:

FIGS. 7-8 depict exemplary images of an environment representative of a captured field of view of a camera onboard a vehicle including reference objects suitable for use in conjunction with the calibration validation process of FIG. 6 in accordance with one or more exemplary embodiments.

DETAILED DESCRIPTION

Figure 1:
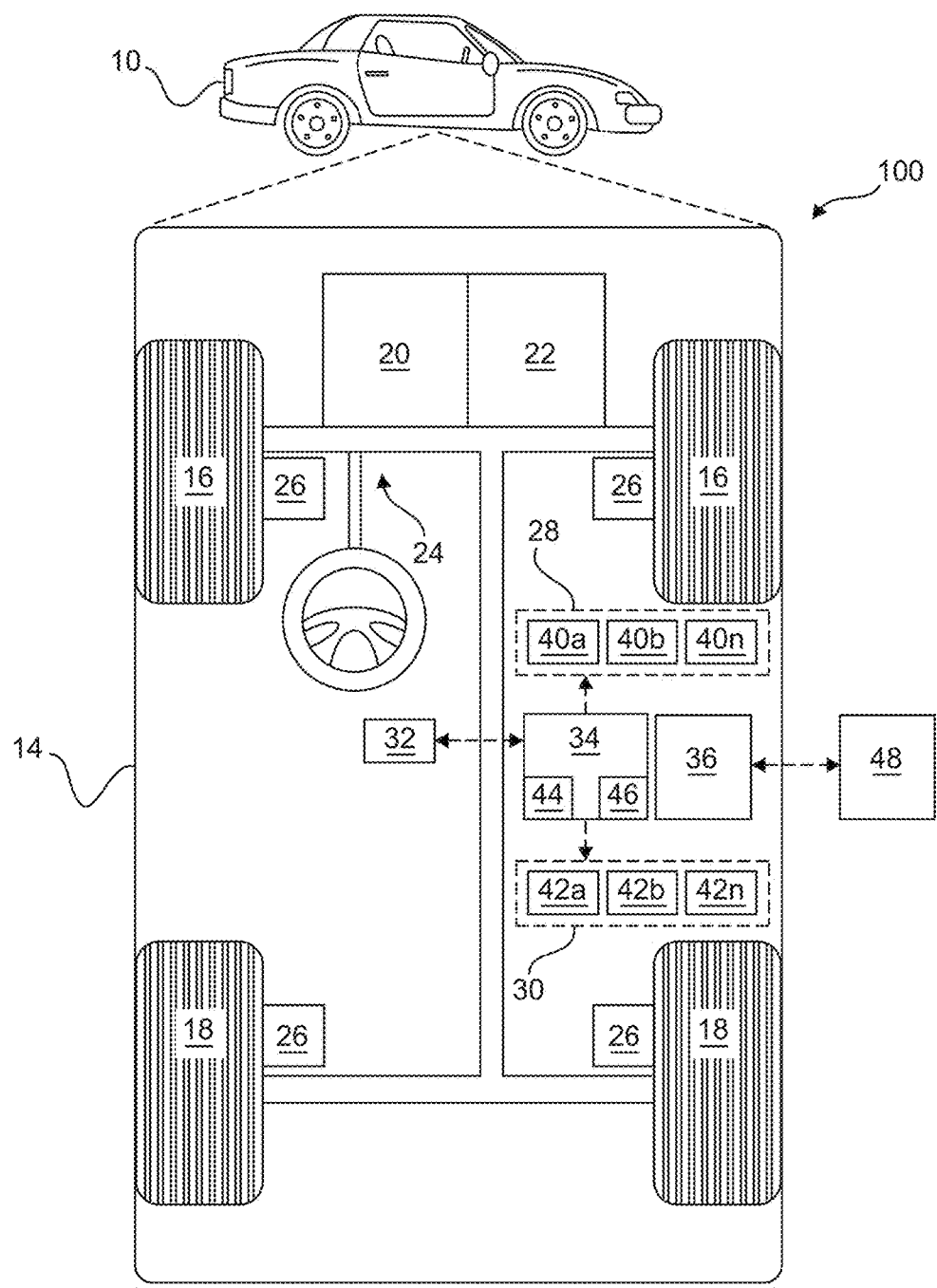
FIG. 1 is a functional block diagram illustrating an autonomous vehicle in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, imaging, ranging, synchronization, calibration, control systems, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In one or more exemplary embodiments described herein, a vehicle capable of some level of autonomous operation includes a number of different devices that capture images or otherwise generate data representative of a scene or environment in a vicinity of the vehicle from different perspectives and with different sampling or refresh rates. The relationship of a particular device may be calibrated with respect to another reference frame, such as the vehicle reference frame or a coordinate frame of another device, resulting in a transformation function that may be utilized to translate from one reference frame to another to establish correlations between data sets.

For example, image data from one onboard imaging device may be correlated with ranging data from a ranging device onboard the vehicle based on the relationship between the line-of-sight and/or field of view of the imaging device and instances in time during which the ranging device is surveying or scanning the field of view associated with the imaging device. Calibrating the relationship between a particular imaging device and a particular ranging device results in conversion parameter values that may be used to translate ranging data from the ranging device to an image captured by the imaging device, and vice versa. For example, coordinate locations or positions may be assigned to portions of the image using the ranging data and the conversion parameter values to translate coordinates or points within the ranging data reference frame to the image data reference frame. In this manner, relative depths or other dimensional or physical attributes may be assigned to regions within the image, which, in turn, may be utilized to detect or otherwise recognize particular types of objects within the image, calculate or determine distances between the objects and the vehicle, and determine commands for steering or otherwise operating the vehicle in a manner that is influenced by the type and relative position of the objects in the vehicle environment.

For purposes of explanation, the subject matter may be described herein primarily in the context of the imaging devices being realized as cameras and the ranging devices being realized as light detection and ranging (lidar) devices. That said, it should be appreciated that the subject matter described herein is not necessarily limited to use with optical cameras and lidars, and alternative embodiments may employ other types of cameras or imaging devices, radar or other types of ranging devices, or any number of combinations of imaging devices and ranging devices.

Exemplary embodiments described in greater detail below primarily in the context of FIGS. 4-8 generally pertain to periodically or continually validating accuracy of an existing calibration during autonomous operation of a vehicle using objects or features having substantially fixed positions in the surrounding environment in the vicinity of the vehicle at a given instant in time. To validate an existing calibration of an onboard device such as a camera, a stationary condition of the vehicle is detected based on the outputs of one or more onboard sensor systems. In response to detecting a stationary condition, a set of data is obtained from the device being analyzed (e.g., an image from the camera) during the stationary condition. The current vehicle pose at the time of the stationary condition is also obtained and utilized to obtain reference data corresponding to a field of view or line of sight of the device being analyzed at the vehicle pose. In this regard, the reference data may include survey or mapping data corresponding to the environment at or around that vehicle pose, which may include objects or features having substantially fixed real-world locations. Such an object or feature having a fixed location is identified within the reference data for the device field of view and its corresponding reference position relative to the vehicle or in some other reference frame is identified based on the reference data. Thereafter, a corresponding object or feature is identified within the data set from the device being analyzed, and then the difference between the known reference position of the object and the position of a corresponding object within the data set is utilized to validate the transformation parameters for converting or translating from the coordinate frame of the device to the reference frame. When the difference is less than a threshold or otherwise indicates the calibration remains valid, use of the existing transformation parameters to assign attributes to device data sets and autonomously operate actuators onboard the vehicle continues. However, when the difference indicates that the calibration may be invalid, one or more remedial actions are undertaken to resolve any discrepancies or anomalies, such as, for example, recalibrating the device.

For example, in response to detecting the vehicle has come to a stop or otherwise reached a stationary condition at an intersection, an image may be captured by an onboard camera and utilized to validate the existing calibrations associated with that camera. Using the current vehicle pose, reference data corresponding to the expected field of view of the camera when stopped at that location may be obtained from a map database or the like. One or more fixed objects such as a traffic signal, a traffic sign, a fire hydrant, or the like may be identified as reference objects within the camera field of view, and their corresponding known or surveyed locations or positions in the vehicle reference frame relative to the vehicle pose may be identified. The calibrated transformation parameters for converting between the vehicle reference frame and the image coordinate frame may be utilized to map the fixed positions of the reference object(s) to expected positions in the image coordinate frame. Thereafter, the image is analyzed to locate object(s) corresponding to the reference object(s) within the image data and obtain their respective observed position(s) in the image coordinate frame. The difference between the expected position(s) of the reference object(s) and the observed position(s) of the corresponding object(s) in the image is determined and a metric indicative of the relative validity of the calibration may be calculated based on the relative difference(s) in positions. In this regard, when the value of the metric indicates that the difference(s) in position(s) exceed some threshold amount, a remedial action may be undertaken, such as, for example, recalibrating the camera or suspending use of existing transformation parameter values until the camera is recalibrated.

Referring now to FIG. 1, in accordance with one or more embodiments, an autonomous vehicle control system shown 100 determines a motion plan for autonomously operating a vehicle 10 along a route in a manner that accounts for objects or obstacles detected by onboard sensors 28, 40, as described in greater detail below. In this regard, a control module onboard the autonomous vehicle 10 calibrates different types of onboard sensors 28, 40 with respect to one another and/or the vehicle 10, thereby allowing data from those different types of onboard sensors 28, 40 to be spatially associated or otherwise with one another based on the calibration, thereby improving object detection, object classification, and the resulting autonomous operation of the vehicle 10.

As depicted in FIG. 1, the vehicle 10 generally includes a chassis, a body 14, and front and rear wheels 16, 18 rotationally coupled to the chassis near a respective corner of the body 14. The body 14 is arranged on the chassis and substantially encloses components of the vehicle 10, and the body 14 and the chassis may jointly form a frame.

In exemplary embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16, 18. The brake system 26 may, in various embodiments, include friction brakes, brake by wire, a regenerative braking system such as an electric machine, and/or other appropriate braking systems. The steering system 24 influences a position of the of the vehicle wheels 16, 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the control system 100 (e.g., in data storage element 46) and, when executed by the processor 44, cause the processor 44 to detect or identify a stationary condition of the vehicle 10 based on the output data from one or more vehicle sensors 40 (e.g., a speed sensor, a positioning sensor, or the like), obtain data captured or generated from imaging and ranging devices 40 while the vehicle 10 is stationary, and validate calibrated relationships with the respective devices 40, as described in greater detail below. Thereafter, the processor 44 may utilize the validated calibrations to establish correlations and transformations between the data sets or the vehicle reference frame to assign attributes from one data set to another data set, and thereby improve object detection, object classification, object prediction, and the like. The resulting objects and their classification and predicted behavior influences the travel plans for autonomously operating the vehicle 10, which, in turn, influences commands generated or otherwise provided by the processor 44 to control actuators 42. In one or more embodiments, the processor 44 detects or identifies a stationary condition of the vehicle 10 and periodically verifies or validates the accuracy of one or more existing calibrations, and in response to an anomalous condition with respect to a calibration, the processor 44 initiates a remedial action, such as, for example, recalibrating a respective device 40 or suspending use of the respective device 40.

Figure 2:
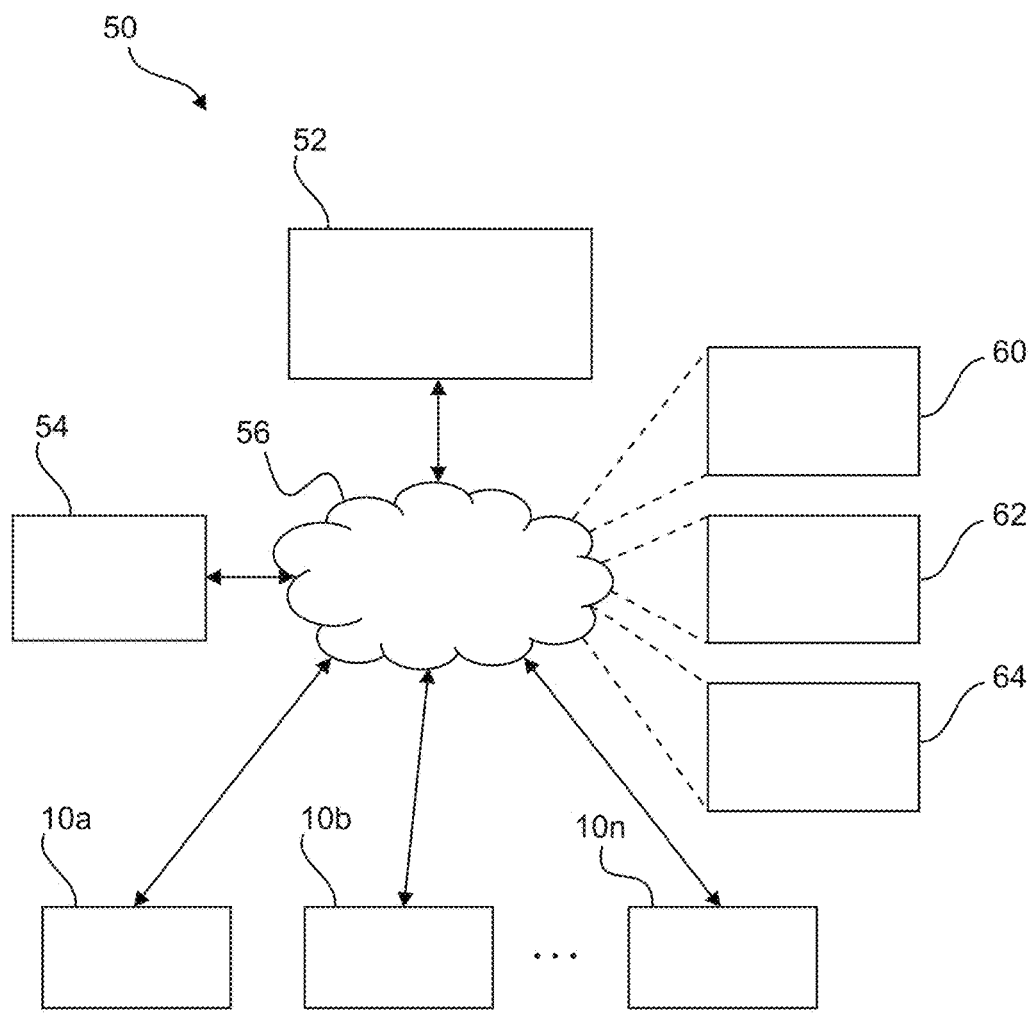
FIG. 2 is a functional block diagram illustrating a transportation system having one or more autonomous vehicles of FIG. 1, in accordance with various embodiments.

Still referring to FIG. 1, in exemplary embodiments, the communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more instances of autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
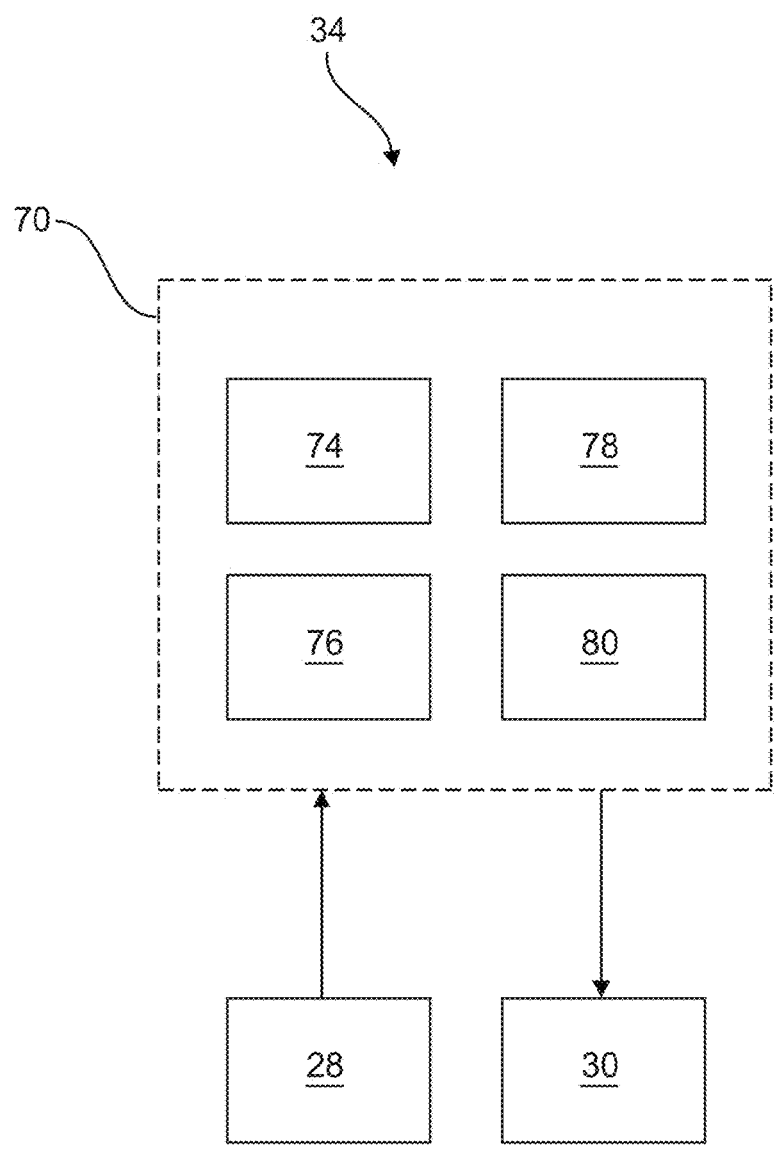
FIG. 3 is a schematic block diagram of an automated driving system (ADS) suitable for implementation by the vehicle of FIG. 1 in accordance with various embodiments.

Referring now to FIG. 3, in accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 and thereby control vehicle acceleration, steering, and braking, respectively, without human intervention.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors. In one or more exemplary embodiments described herein, the sensor fusion system 74 supports or otherwise performs the calibration validation processes described herein in greater detail below primarily in the context of FIG. 6. In exemplary embodiments, the sensor fusion system 74 correlates image data to lidar point cloud data, the vehicle reference frame, or some other reference coordinate frame using calibrated conversion parameter values associated with the pairing of the respective camera and reference frame to assign depths to the image data, identify objects in one or more of the image data, or otherwise synthesize associated image data and other data, such as lidar data. In other words, the sensor output from the sensor fusion system 74 provided to the vehicle control system 80 (e.g., indicia of detected objects and/or their locations relative to the vehicle 10) reflects or is otherwise influenced by the calibrations and associations between camera images, lidar point cloud data, and the like.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
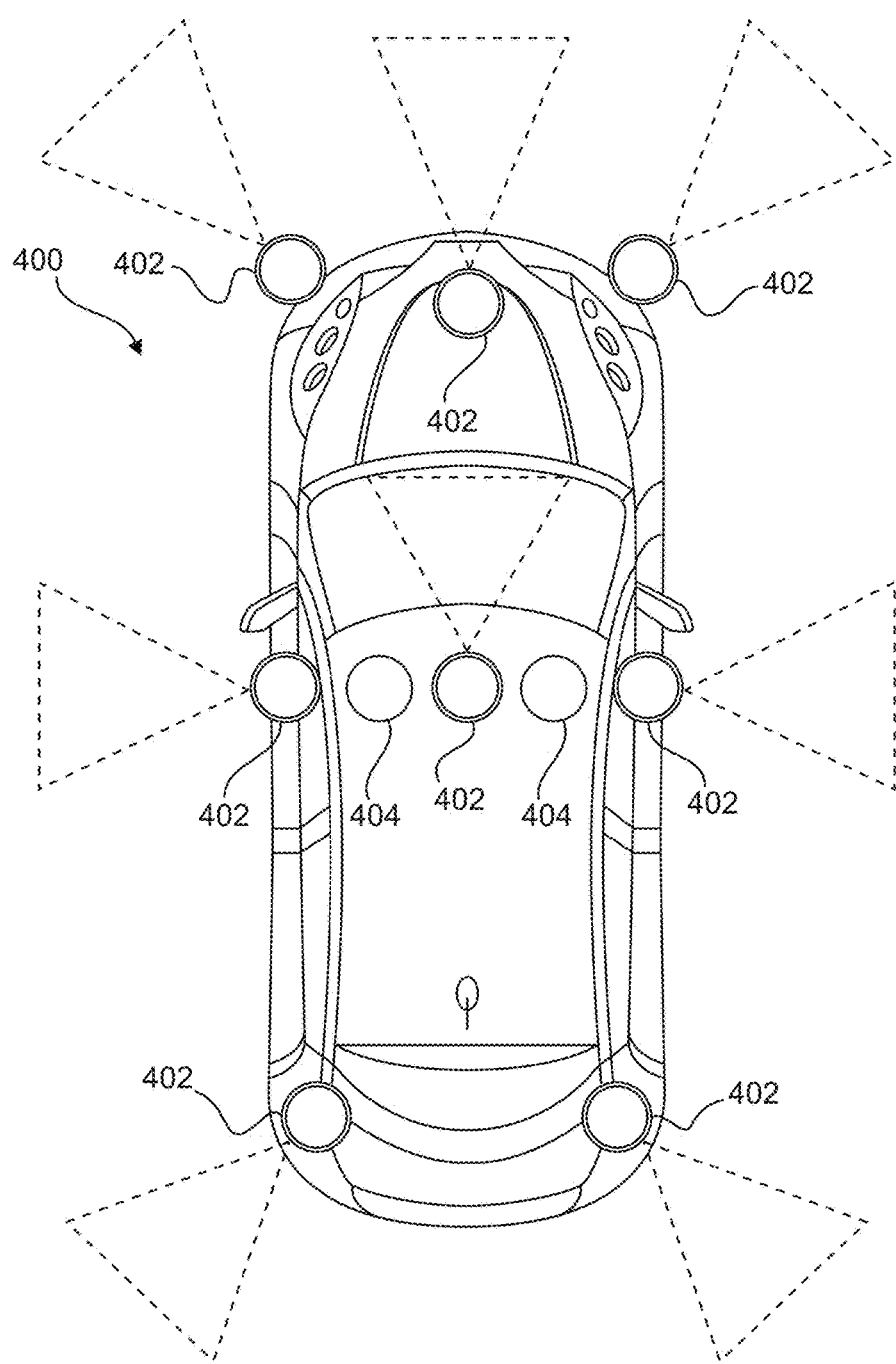
FIG. 4 is an illustration of an arrangement of a plurality of imaging devices and a plurality of ranging devices onboard a vehicle such as the autonomous vehicle of FIG. 1 in accordance with various embodiments.

FIG. 4 depicts an exemplary vehicle 400 that includes a plurality of cameras 402 distributed about the vehicle 400 and a plurality of ranging devices 404 distributed about the vehicle 400. The cameras 402 are disposed at different locations and oriented to provide different field of views that capture different portions of the surrounding environment in the vicinity of the vehicle 400. For example, a first camera 402 is positioned at the front left (or driver) side of the vehicle 400 and has its field of view oriented 45° counter-clockwise relative to the longitudinal axis of the vehicle 400 in the forward direction, and another camera 402 may be positioned at the front right (or passenger) side of the vehicle 400 and has its field of view oriented 45° clockwise relative to the longitudinal axis of the vehicle 400. Additional cameras 402 are positioned at the rear left and right sides of the vehicle 400 and similarly oriented away from the longitudinal axis at 45° relative to the vehicle longitudinal axis, along with cameras 402 positioned on the left and right sides of the vehicle 400 and oriented away from the longitudinal axis perpendicular to the vehicle longitudinal axis. The illustrated embodiment also includes a pair of cameras 402 positioned at or near the vehicle longitudinal axis and oriented to capture a forward looking field of view along a line of sight substantially parallel to the vehicle longitudinal axis.

In exemplary embodiments, the cameras 402 have angle of views, focal lengths, and other attributes that may be different from those of one or more other cameras 402. For example, the cameras 402 on the right and left sides of the vehicle may have an angle of view that is greater than the angle of view associated with the cameras 402 positioned at the front left, front right, rear left, or rear right of the vehicle. In some embodiments, the angle of view of the cameras 402 are chosen so that the field of view of different cameras 402 overlap, at least in part, to ensure camera coverage at particular locations or orientations relative to the vehicle 400.

One of more ranging devices 404 are also disposed at different locations of the vehicle 400, and in one embodiment, are disposed symmetrically about the longitudinal axis of the vehicle 400 to achieve parallax. In exemplary embodiments described herein, the ranging devices 404 are realized as lidar devices. In this regard, each of the ranging devices 404 may include or incorporate one or more lasers, scanning components, optical arrangements, photodetectors, and other components suitably configured to horizontally and rotatably scan the environment in the vicinity of the vehicle 400 with a particular angular frequency or rotational velocity. For example, in one embodiment, each lidar device 404 is configured to horizontally rotate and scan 360° at a frequency of 10 Hertz (Hz). As used herein, a lidar scan should be understood as referring to a single revolution of a lidar device 404.

In exemplary embodiments described herein, the cameras 402 autonomously and automatically captures images at a particular frequency, which may be greater than the angular frequency of the lidar devices 404. In one embodiment, the frequency or sampling rate of the cameras 402 is at least twice the angular frequency of the lidar device 404. For example, the cameras 402 may capture new image data corresponding to their respective field of view at a rate of 30 Hz while the lidar device 404 scans and automatically provides updated data at a rate of 10 Hz. Thus, each camera 402 may capture multiple images per lidar scan, and capture the images at different times independent of the orientation of the lidar device 404 or the angular position within the scan. In such embodiments, an image from each respective camera 402 that is temporally associated with the lidar point cloud data from a particular lidar scan may be selected or identified based on the relative time difference between when the image is obtained and when the angular position of the lidar scan corresponds to the line of sight of a lidar device 404 being aligned with the line of sight or the angle of view of the respective camera 402.

In other embodiments, images obtained during a lidar scan may be fused or otherwise combined to achieve a representative image corresponding to the lidar scan. In yet other embodiments, the cameras 402 may be triggered or otherwise controlled to capture images at the instance in time during a lidar scan when the angular position of the lidar scan corresponds to the line of sight of a lidar device 404 being aligned with the line of sight or the angle of view of the respective camera 402. In this regard, it should be understood there are numerous different ways to synchronize or temporally associate different data sets, and the subject matter described herein is not intended to be limited to any particular manner for identifying or associating image data of a region with a lidar scan of that region or corresponding lidar data representative of that region.

Figure 5:
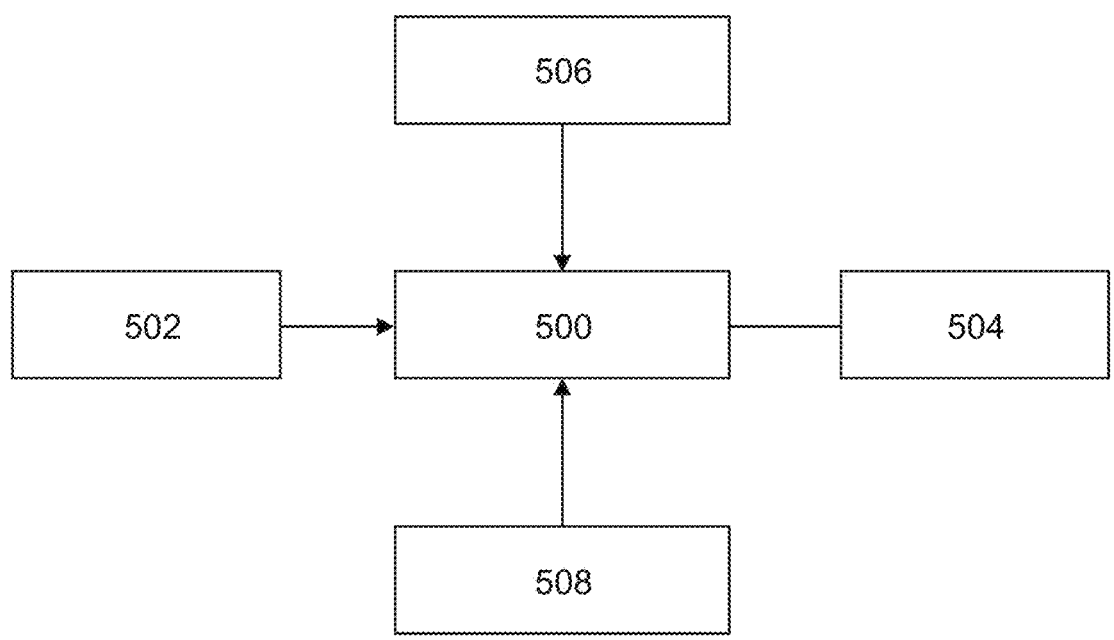
FIG. 5 is a block diagram of a processing module for implementation onboard the vehicle of FIG. 1 or FIG. 4 in accordance with one or more exemplary embodiments.

FIG. 5 depicts an embodiment of a processing module 500 (or control module) which may be implemented by or incorporated into the controller 34, the processor 44, and/or the sensor fusion system 74. The processing module 500 is coupled to a sensing device 502 onboard the vehicle, such as a camera (e.g., one of cameras 402) or a lidar device (e.g., one of lidar devices 404). For purposes of explanation, the subject matter is described herein in the context of the onboard sensing device 502 being realized as a camera, however, it should be appreciated the calibration validation processes described herein are not limited to any particular type of device and may be implemented in an equivalent manner for lidar devices or any other sensing device. Additionally, it should be noted that although FIG. 5 depicts a single camera 502, in practice, the processing module 500 may be coupled to multiple sensing devices 40, 402, 404 onboard a vehicle 10, 400 to perform the calibration validation processes described herein with respect to multiple devices 40, 402, 404 substantially concurrently or in parallel.

In exemplary embodiments, the processing module 500 calibrates the relationship between the coordinate frame of the camera 502 (or camera reference frame) and one or more different coordinate frames, such as a coordinate frame referenced to the vehicle pose (e.g., the vehicle reference frame) or a coordinate frame associated with a lidar or other ranging device onboard the vehicle. The processing module 500 stores or otherwise maintains the calibration data characterizing the relationship in the data storage element 504. In this regard, the calibration data may include values for variables of a function for spatially translating from the camera reference frame to another reference frame, or vice versa. Thereafter, when correlating subsequent image data with lidar point cloud data or other environmental data, the processing module 500 may utilize the calibration data to assign attributes to the image data, or vice versa. For example, in one or more embodiments, the processing module 500 is configured to buffer, store or otherwise maintain image data corresponding to one or more images (or samples) captured by the camera 502 per lidar scan and select or otherwise identify a captured image temporally associated with the lidar scan of the camera field of view. The transformation parameter values may then be utilized to project lidar data from the scan of the camera field of view onto the image data (e.g., by converting to the camera reference frame) to assign depths, distances, or other dimensional characteristics to the selected image, or alternatively, utilize the image data to identify regions of interest within the lidar data for object detection and/or classification. In this manner, a calibrated correlation between image data and point cloud data may be utilized by the processing module 500 to detect objects for classification, prediction, and analysis.

As described in greater detail below in the context of FIG. 6, the processing module 500 detects a stationary condition of the vehicle and validates the existing calibration of the camera 502 using reference data corresponding to the current position of the vehicle obtained from a reference data source 508, such as a mapping data or survey data from a map database. In this regard, the processing module 500 is coupled to a vehicle positioning system 506 (which could be implemented as part of or in conjunction with positioning system 76), which processes sensor data to determine the current velocity, acceleration, heading, and pose of the vehicle. In exemplary embodiments, the current vehicle pose includes coordinates that define the position or location of the vehicle with respect to the Earth and pitch, roll, and yaw values that define the orientation of the vehicle with respect to the Earth. For example, the positioning system 506 may receive latitude and longitude coordinates of the vehicle from a GPS system onboard the vehicle and utilize the spatial coordinates of the vehicle to obtain mapping data corresponding to the location from the map database 508. Using the mapping data corresponding to surface of the road and environment surrounding the vehicle, the positioning system 506 may use the vehicle heading, lidar data and/or potentially other sensor data (e.g., pitch, roll, yaw data from an onboard gyroscope, accelerometer, or the like) to determine a current three-dimensional coordinate location of the vehicle with respect to the coordinate frame of the mapping data along with current pitch, roll, and yaw values for the vehicle relative to the roadway surface.

In response to detecting the vehicle is stationary (e.g., based on the current velocity and/or acceleration), the processing module 500 utilizes the current vehicle pose to determine an expected current field of view of the camera 502 with respect to the surrounding environment based on the position and orientation of the camera 502 relative to the vehicle. Thereafter, the processing module 500 analyzes the mapping data associated with the current vehicle pose to identify one or more reference objects within the expected current field of view and their corresponding reference locations in the coordinate frame of the mapping data. Using the existing calibration transformation parameter values associated with the camera 502, the processing module 500 converts the reference locations for the reference objects from the mapping coordinate frame to corresponding reference locations within the camera reference frame where the reference objects would be expected to be observed by the camera 502 within the camera field of view.

The processing module 500 obtains an image captured by the camera 502 at the vehicle pose during the stationary condition and analyzes the image to identify or otherwise locate, within the image data, objects or features corresponding to the reference objects and their corresponding observed positions in the camera coordinate frame. The processing module 500 calculates or otherwise determines a calibration validity metric based on the difference between the observed positions of the identified objects in the camera coordinate frame and the expected positions of the reference objects in the camera coordinate frame and validates the existing calibration of the camera based on the metric. In some embodiments, the processing module 500 may also store or otherwise maintain calculated calibration validity metric values associated with different instances of stationary conditions in the data storage element 504 to identify trends or patterns indicative of an anomalous calibration, as described in greater detail below.

Figure 6:
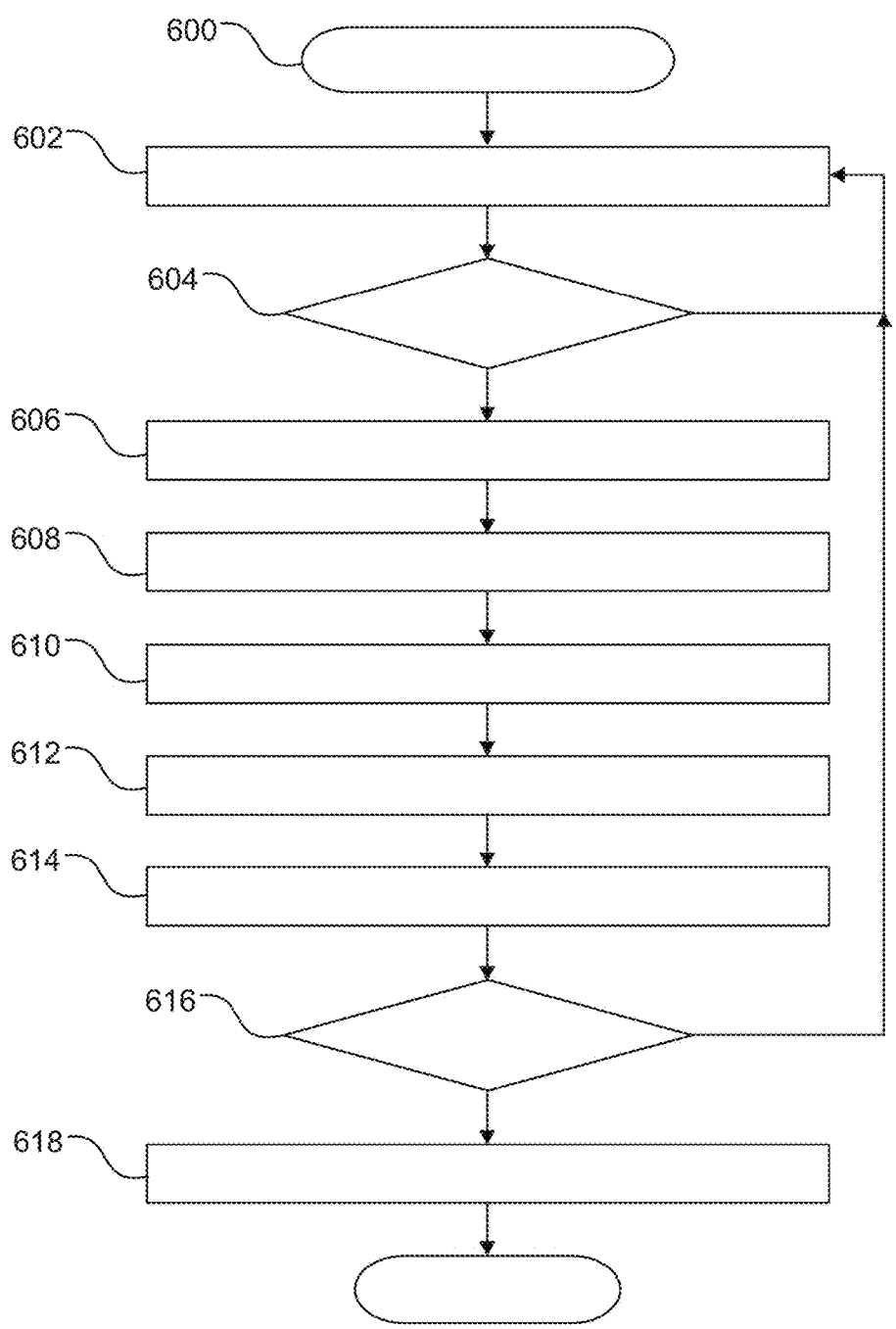
FIG. 6 is a flowchart illustrating a calibration validation process in accordance with one or more exemplary embodiments.

Referring now to FIG. 6, and with continued reference to FIGS. 1-5, a flow diagram illustrates various embodiments of a calibration validation process 600 which may be embedded within a controller 34 in the control system 100 of FIG. 1 supporting the ADS 70. In this regard, one or more control modules 34, 44, 500 onboard a vehicle 10, 400 may implement or otherwise perform the calibration validation process 600. The order of operation within the method is not limited to execution sequentially as depicted in FIG. 6, but may be performed in one or more varying orders as applicable and in accordance with the present disclosure. Moreover, one or more of the tasks shown and described in the context of FIG. 6 could be omitted from a practical embodiment of the calibration validation process 600 while still achieving the generally intended overall functionality. In various embodiments, the calibration validation process 600 can be scheduled to run based on one or more predetermined events, and/or can run periodically or continually during operation of the autonomous vehicle 10, 400.

In exemplary embodiments, the calibration validation process 600 begins by receiving or otherwise obtaining data from one or more onboard vehicle sensors at 602 and detecting or otherwise identifying when the vehicle is stationary at 604. For example, as described above, a control module 34, 500 onboard the vehicle may be coupled to one or more onboard vehicle sensors 40 providing respective outputs that may be analyzed or monitored to determine when the vehicle 10, 400 is stationary, such as speed sensors, positioning sensors, throttle sensors, brake sensors, and the like. Additional vehicle pose information may be received from a positioning system 76, 506 onboard the vehicle 10, 400 which may also be analyzed to detect whether the vehicle 10, 400 is stationary, such as, for example, latitude and longitudinal coordinates, GPS coordinates, or some other location or position information. The calibration validation process 600 may detect a stationary condition of the vehicle 10, 400 when the speed or velocity of the vehicle 10, 400 is equal to zero, the acceleration of the vehicle 10, 400 is equal to zero, and the position of the vehicle 10, 400 is stable or unchanged. In some embodiments, the control module 34, 500 may also analyze commands currently being provided to various vehicle actuators 30, 42 (e.g., the outputs of the vehicle control system 80), such as braking commands, throttle commands, or the like to confirm that the position of the vehicle 10, 400 is intended to remain stable or unchanged for at least a threshold amount of time greater than or equal to a duration corresponding to the sampling frequency of the camera 402, 502 to ensure that an image from the camera 402, 502 can be obtained during the stationary condition. In this manner, the calibration validation process 600 ensures the image data used for the calibration validation will not include noise or other artifacts that could be introduced by movement of the vehicle 10, 400.

After identifying a stationary condition, the validation process 600 continues by identifying or otherwise selecting one or more images captured by the camera at the current vehicle pose during the stationary condition to be utilized for validating the calibration of the camera at 606. For example, based on timestamps associated with images from the camera 402, 502 and a time associated with the stationary condition, the processing module 500 may select or otherwise identify an image captured by the camera 402, 502 during the stationary condition for use in validating the existing camera calibration.

The validation process 600 continues by identifying one or more reference objects having known fixed positions that are expected to be within the field of view of the camera at the current vehicle pose during the stationary condition at 608 and calculating or otherwise determining their corresponding reference positions in the camera coordinate frame at 610. For example, using information about the pose of the camera 402, 502 and its field of view with respect to the vehicle along with the current vehicle pose during the stationary condition, an expected field of view for the camera 402, 502 (alternatively, an expected camera viewing region) relative to the vehicle may be determined in the reference coordinate frame for the vehicle pose, which, in exemplary embodiments, is the same reference coordinate frame used for the surveyed or mapped environmental data stored in a map database 32, 508. In other words, a subset of mapping data corresponding to the vehicle pose that corresponds to the field of view of the camera 402, 502 during the stationary condition is identified based on a pose of the camera relative to the vehicle 10, 400. Using the coordinates for the expected camera field of view in the reference coordinate frame, the control module 34, 500 may access the map database 32, 508 to obtain mapping data corresponding to the expected camera viewing region and then analyze the mapping data to identify one or more fixed objects that have been mapped or surveyed within the expected camera viewing region, such as, for example, traffic signals, traffic signs, or the like.

For each fixed object identified, the control module 34, 500 may determine a corresponding reference position of that object in the reference coordinate frame, such as, for example, by calculating a geometric center of the object in the reference coordinate frame. The fixed reference positions for the reference objects are transformed to corresponding reference positions in the image data coordinate frame using existing calibration parameter values. For example, calibration transformation parameter values for converting between the camera coordinate frame and the vehicle reference frame may be utilized to convert fixed reference positions in the vehicle reference frame to corresponding reference positions in the camera coordinate frame, which represent the expected positions of the reference objects within the captured image data.

In some embodiments, ranging data from a lidar device 404 or another device onboard the vehicle 10, 400 may be utilized to augment the reference position of a respective reference object in a reference coordinate frame prior to determining expected positions in the camera coordinate frame. For example, a detected or measured position of the reference object using the lidar device 404 may be converted to the reference frame (e.g., using calibrated transformation parameter values associated with the lidar device 404) to obtain a measured position of the reference object in the reference frame which may be averaged or otherwise combined with the mapped or surveyed position of the reference object in the reference frame to arrive at the reference position, which is then utilized to determine the expected position of the reference object in the camera coordinate frame.

After identifying one or more reference objects having fixed reference positions, the validation process 600 continues by locating or otherwise identifying the reference object(s) within the image data captured during the stationary condition at 612. In one embodiment, the fixed reference positions for the reference objects are transformed to corresponding reference positions in the image data coordinate frame using existing calibration parameter values. For example, calibration transformation parameter values for converting between the camera coordinate frame and the vehicle reference frame may be utilized to convert fixed reference positions in the vehicle reference frame to corresponding reference positions in the camera coordinate frame, which correspond to the expected positions of the reference objects within the captured image data. The expected positions of the reference objects may be utilized to define regions of the captured image data encompassing the expected positions. The regions may then be searched to locate the reference objects within the image data. In this regard, the regions may be generated with a shape that corresponds to a characteristic shape of the particular type of reference object being searched for (e.g., a rectangular region for a substantially rectangular traffic signal). In one embodiment, a convolutional neural network is applied to the regions of image data to identify reference objects within the regions, however, other techniques for processing or analyzing images may be utilized. For example, changes in intensity, color, or other graphical characteristics within a region that is characteristic of a type of reference object may be utilized to recognize or otherwise identify that type of reference object within that region of image data. For each reference object identified within the image data, the control module 34, 500 may calculate or otherwise determine an observed position of the respective object in the image coordinate frame, for example, by calculating a geometric center of the object in the image coordinate frame.

Based on the relationship between the observed position(s) within the captured image and the expected position(s) of the reference object(s) in the captured image, the validation process 600 calculates or otherwise determines a value for a calibration validity metric at 614 and determines whether the existing calibration is valid based on the calibration validity metric at 616. In this regard, when the value for the calibration validity metric indicates a potential anomalous calibration, the validation process 600 initiates one or more remedial actions at 618. For example, in one embodiment, use of the camera 402, 502 may be suspended or limited in a manner that avoids utilizing the potentially anomalous calibration parameter values and a notification is generated or otherwise provided that indicates maintenance is required (e.g., by the control module 34, 500 activating or otherwise illuminating one or more lights, indicators, or other elements on a dashboard of the vehicle 10, 400). In another embodiment, the control module 34, 500 initiates recalibration of the camera 402, 502 to facilitate continued autonomous operation of the vehicle 10, 400 using the camera 402, 502. That said, when the calibration validity metric indicates the existing calibration is accurate or otherwise valid, the control module 34, 500 continues with determining commands for autonomously operating the vehicle 10, 400 in a manner that is influenced by the transformation parameter values and the captured image data (e.g., avoiding objects detected or characterized with in the image data based on the transformation parameter values).

In one embodiment, the calibration validity metric is a difference between the observed position of an object within the captured image and its expected position. In this regard, for multiple reference objects within the camera field of view, a cumulative difference metric may be calculated by averaging the respective differences between observed position and expected position for each of the reference objects. The difference metric may be compared to a threshold value and an anomalous condition may be identified when the difference metric exceeds the threshold value. The threshold value may also be chosen to account for potential sources of noise, variability or tolerance in device performance, vehicle pose, or the like, deviations due to estimations or intervening calculations, and the like.

In exemplary embodiments, the difference between the observed position of an object within the captured image and its expected position is normalized to account for the distance of the object from the camera. For example, as the distance of an object from the camera increases, the number of pixels between the expected position and observed position of an object will decrease as a function of the distance rather than the accuracy of the calibration. Thus, a smaller positional difference associated with distant objects may be scaled up based on the distance to equate to a similar positional difference associated with an object closer to the camera, or vice versa. In this regard, the relative differences may be normalized or scaled so that they are referenced to a particular reference distance from the camera.

In some embodiments, the calculated value for the calibration validity metric may be stored in association with a particular iteration of the validation process 600 and compared to preceding or succeeding calibration validity metric values to identify trends or patterns in the calibration validity metric that are indicative of an anomalous calibration. For example, even though the individual difference metric values may be less than a threshold value indicative of an anomalous calibration, when each of the individual difference metric values over a preceding time interval exceed a second threshold value, the validation process 600 may identify a potentially anomalous calibration and initiate remedial action. For example, a lower threshold value may be chosen as a fraction of the threshold value used to identify an anomalous calibration based on an individual calibration validity metric value (e.g., 75% of the threshold value), and when a sequence of successive calibration validity metrics over a preceding time interval (e.g., the preceding 2 hours) each exceed that lower threshold value, the validation process 600 may determine that the relatively high calibration validity metric values are not attributable to noise, device variations, or processing variations but more likely attributable to an anomalous calibration.

In alternative embodiments of the validation process 600, a calibration validity threshold may be incorporated at 612, in which case task 614 may be omitted from the validation process 600. For example, a calibration validity threshold may be utilized to calculate or otherwise determine the size or area of the region within the image coordinate frame that encompasses the expected position of a reference object. In such embodiments, when the existing calibration parameter values are valid, the observed position of the reference object within the image data resides within or overlaps, at least in part, the calculated region. Thus, when the existing calibration parameter values are invalid or the existing calibration is otherwise potentially anomalous, the validation process 600 may fail to identify the reference object at an observed position within the region of image data encompassing the expected position of the reference object. In response to failing to detect the reference object at or within the threshold distance of the expected position within the image data at 616, the validation process 600 proceeds with initiating a remedial action at 618 as described above.

Figure 7:
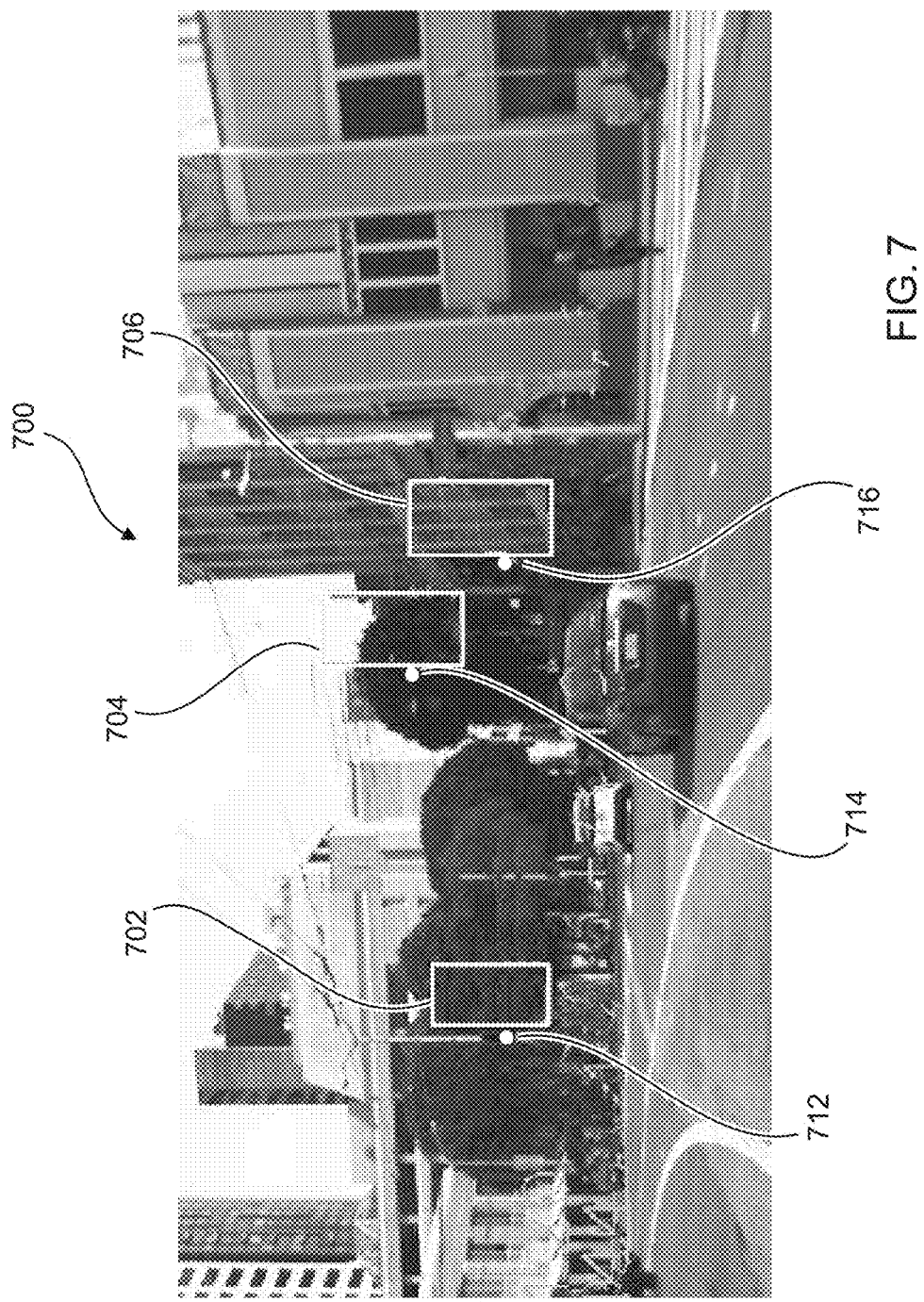

FIG. 7 depicts an exemplary image 700 of a field of view of a camera captured during a stationary condition during an exemplary iteration of the validation process 600 where the existing calibration is exhibiting an anomalous condition. As described above, based on the current vehicle pose and the camera pose with respect to the vehicle, the control module 34, 500 calculates an expected field of view of the camera and identifies a plurality of reference objects (traffic signals) having fixed positions within the expected field of view using a map database. Using the calibrated transformation parameter values associated with the camera, the reference positions of the traffic signals are transformed to corresponding pixel locations or coordinates within the image coordinate frame, and corresponding regions 702, 704, 706 encompassing those expected positions within the image 700 may be calculated or otherwise determined. A convolutional neural network may be applied to each of the regions 702, 704, 706 to search those regions for the respective traffic signals. As depicted, by virtue of the calibrated transformation parameter values being potentially inaccurate, the observed positions of the traffic signals 712, 714, 716 outside their respective expected observation regions. As described above, based on the failure to identify the traffic signals 712, 714, 716 within the expected observation regions 702, 704, 706 of the image 700 or based on the difference between the observed positions of the traffic signals 712, 714, 716 and their expected positions (e.g., the geometric centers of regions 702, 704, 706), the existing calibration associated with the camera may be indicated as potentially invalid or anomalous and one or more remedial actions may be initiated.

FIG. 8 depicts another exemplary image 800 of a field of view of a camera captured during a stationary condition during another exemplary iteration of the validation process 600. In the embodiment of FIG. 8, the observed positions of the traffic signals 812, 814 reside within the expected observation regions 802, 804 calculated based on the mapping data for those traffic signals and the existing calibrated transformation parameter values associated with the camera. Thus, applying a convolutional neural network or similar image analysis algorithm to the expected observation regions 802, 804 results in the control module 34, 500 identifying the traffic signals 812, 814 within the expected observation regions 802, 804. Based on the difference between the observed positions of the traffic signals 812, 814 (e.g., the geometric centers of the observed traffic signals 812, 814 in the image coordinate frame) and their expected positions (e.g., the geometric centers of the regions 802, 804 in the image coordinate frame), the control module 34, 500 may calculate or otherwise determine a calibration validity metric, which, in turn, may be utilized to validate the existing calibration based on the image 800 or initiate one or more remedial actions based on the image 800, as described above.

To briefly summarize, the subject matter described herein allows for the measured location of a feature having a fixed position to be compared to an expected position for that feature that is influenced by calibrated parameter values to thereby verify the continued accuracy of those calibrated parameter values and validate the existing calibration. In the context of validating a camera calibration, to obtain an estimate of a feature is expected to be in the camera field of view, where the feature is located with respect to the camera in a three-dimensional plane is projected onto the two-dimensional plane of the image using the current vehicle pose (e.g., position [x, y, z] and orientation [pitch, roll, yaw]), the pose of the camera with respect to the vehicle, and the known fixed pose of the feature as derived from mapping data. A convolutional neural network can then be applied to a region of the image encompassing that estimated expected position of the feature within the two-dimensional image plane to determine the measured or observed location of the feature within the image. Based on the difference between the expected and observed positions of the feature, the calibration may be validated or remedial action may be initiated (e.g., indicating a need for maintenance or recalibration). By ensuring the vehicle is stationary when the images used for the calibration validation are captured, the impact of noise attributable to vehicle motion may be reduced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, the method comprising:
    detecting, by a control module onboard the vehicle, a stationary condition of the vehicle based at least in part on output of a sensor system onboard the vehicle;
    in response to the stationary condition, obtaining, by the control module, an image from an imaging device onboard the vehicle during the stationary condition; and
    obtaining, by the control module from a map database, a subset of mapping data corresponding to a vehicle pose during the stationary condition based on a pose of the imaging device relative to the vehicle, wherein the subset of mapping data corresponds to the field of view of the imaging device;
    identifying, by the control module, an expected position for a reference object having a fixed position based on the subset of mapping data and a transformation associated with the imaging device;
    identifying, by the control module, the reference object at an observed position within the image;
    validating, by the control module, the transformation associated with the imaging device based on a difference between the expected position and the observed position; and
    operating, by the control module, one or more actuators onboard the vehicle in a manner that is influenced by the validated transformation.

2. The method of claim 1, further comprising, after validating the transformation:
    assigning, by the control module, one or more attributes to the image based at least in part on the transformation, wherein operating the one or more actuators comprises autonomously operating, by the control module, one or more actuators onboard the vehicle in a manner that is influenced by the one or more attributes assigned to the image.

3. The method of claim 1, further comprising identifying the reference object within the subset of the mapping data.

4. The method of claim 3, the reference object having the fixed position within the subset of the mapping data, wherein identifying the expected position comprises determining the expected position of the reference object in a coordinate frame associated with the imaging device based on the transformation.

5. The method of claim 4, wherein identifying the reference object at the observed position comprises:
    determining a region of the image encompassing the expected position of the reference object; and
    searching the region of the image for the reference object.

6. The method of claim 5, further comprising initiating, by the control module, a remedial action with respect to the imaging device in response to a failure to identify the reference object within the region of the image.

7. The method of claim 5, wherein searching the region of the image of the reference object comprises applying a convolutional neural network to the region of the image to locate the reference object within the region.

8. The method of claim 4, wherein validating the transformation comprises:
    calculating a validity metric value based on the difference between the expected position and the observed position; and
    validating the transformation when the validity metric value is less than a threshold.

9. The method of claim 4, further comprising initiating, by the control module, a remedial action with respect to the imaging device when the difference between the expected position and the observed position is greater than a threshold.

10. A vehicle, comprising:
    an imaging device onboard the vehicle;
    a map database storing mapping data;
    one or more sensors onboard the vehicle;
    one or more actuators onboard the vehicle; and
    a controller that, by a processor, detects a stationary condition based at least in part on output of the one or more sensors, obtains an image from the imaging device during the stationary condition, obtains a subset of the mapping data corresponding to a field of view of the imaging device at a vehicle pose during the stationary condition based on a pose of the imaging device relative to the vehicle from the mapping data, identifies an expected position for a reference object having a fixed position based on the subset of the mapping data and a transformation associated with the imaging device, identifies the reference object at an observed position within the image, validates the transformation associated with the imaging device based on a difference between the expected position and the observed position, and thereafter autonomously operates the one or more actuators onboard the vehicle in a manner that is influenced by the validated transformation.

11. The vehicle of claim 10, wherein:
the expected position comprises an expected position of the reference object in a coordinate frame associated with the imaging device based on the transformation and the fixed position within the subset of the mapping data.

12. The vehicle of claim 10, wherein the controller determines a region of the image encompassing the expected position of the reference object and searches the region of the image for the reference object to identify the reference object at the observed position within the image.

13. The vehicle of claim 12, wherein the controller initiates a remedial action with respect to the imaging device in response to an absence of the reference object within the region of the image.

14. The vehicle of claim 10, further comprising a ranging device onboard the vehicle providing ranging data, wherein the controller autonomously operates the one or more actuators onboard the vehicle in a manner that is influenced by the validated transformation by:
assigning one or more attributes to the image based at least in part on the ranging data and one or more calibrated parameter values associated with the transformation;
identifying an object based at least in part on the one or more attributes; and
determining a command for the one or more actuators in a manner that is influenced by the object.

15. The vehicle of claim 14, wherein the imaging device comprises a camera and the ranging device comprises a lidar device.

16. A method of controlling a vehicle, the method comprising:
obtaining first data from a sensing device onboard the vehicle during a stationary condition of the vehicle;
identifying an expected position for a reference object within the first data based on reference data corresponding to a field of view of the sensing device and one or more calibrated transformation parameter values associated with the sensing device, wherein identifying the expected position comprises:
obtaining mapping data corresponding to a vehicle pose during the stationary condition from a map database;
identifying a subset of the mapping data corresponding to the field of view of the sensing device based on a pose of the sensing device relative to the vehicle;
identifying the reference object at a fixed position within the subset of the mapping data;
converting the fixed position to the expected position in a coordinate frame associated with the sensing device based on the one or more calibrated transformation parameter values;
identifying the reference object at an observed position within the first data; and
initiating a remedial action with respect to the sensing device when a difference between the expected position and the observed position is greater than a threshold;
validating the one or more calibrated transformation parameter values when the difference between the expected position and the observed position is less than the threshold; and
operating one or more actuators onboard the vehicle in a manner that is influenced by the calibrated transformation parameter values after validation.

\* \* \* \* \*